March 29, 1927.

K. E. PEILER

APPARATUS FOR FEEDING MOLTEN GLASS

Filed March 31, 1925

1,622,666

Inventor
Karl E. Peiler
by Robert S. Brown
Attorney.

Patented Mar. 29, 1927.

1,622,666

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR FEEDING MOLTEN GLASS.

Application filed March 31, 1925. Serial No. 19,567.

This invention relates to apparatus for feeding molten glass, and one of its objects is to provide an improved heated outlet construction for such feeders through which the glass is discharged from a furnace or other suitable container.

Another object of the invention is to provide apparatus of the character designated which may be readily assembled and may be removable and easily replaced as a unit.

A further object of the invention is to provide an orifice heater unit which shall be durable in construction, simple in operation and inexpensive to manufacture. These and other objects will be more manifest from the accompanying drawing and description, and from the appended claims.

Figure 1:
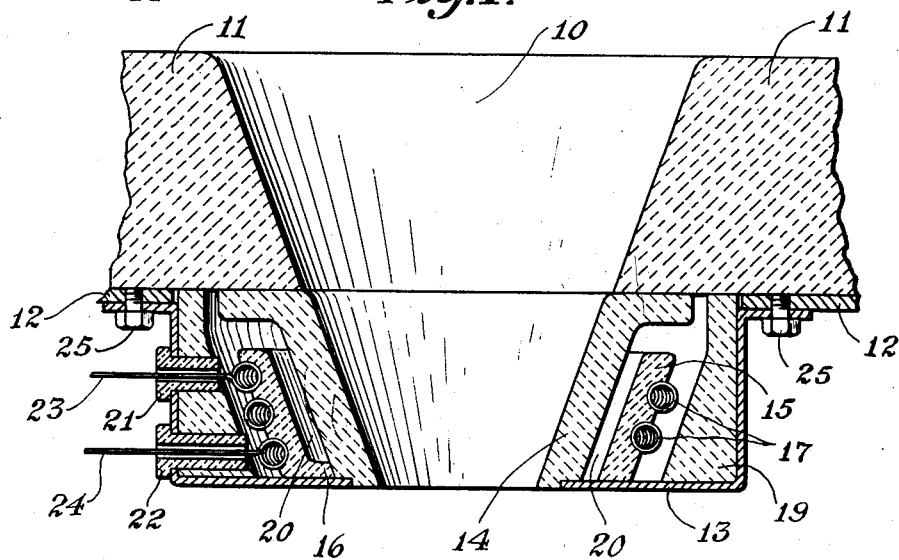
Figure 1 is a view showing a vertical section of a heater construction embodying the invention.
Figure 4:
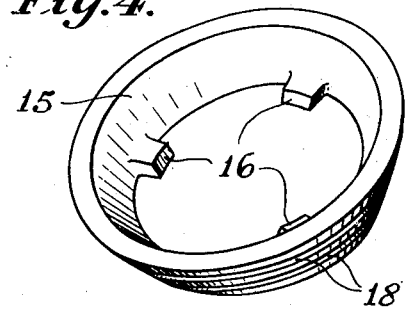
Fig. 4 is a perspective view of the support for the heater elements shown in the preceding figures.

Referring to Fig. 1 of the drawing, the numeral 10 indicates a glass discharge well of conventional type located in the bottom wall 11 of any suitable container for feeding molten glass such as a forehearth connected to a glass melting furnace. This wall is supported by suitable metallic frame members 12. Located adjacent to the container wall and aligned with the well 10, is secured an outlet ring having uxiliary heating apparatus constructed in accordance with the present invention.

The heater unit comprises a metallic casing member 13, in which is supported an orifice ring 14. This ring may be made of fire clay or other suitable refractory material. The ring 14 is shown to resemble the frustum of a cone but it will be readily understood that this ring may be made in any desired shape. Surrounding the ring 14 and spaced therefrom is a refractory support 15, having its sides substantially parallel to the sides of the orifice ring 14, with which it is associated. While the support 15 may be made of any suitable refractory material, I preferably use a fused alumina material known as alundum, this material having a sufficient electrical insulating value at its working temperature. The support 15 is retained in position by spacing elements 16 provided around its bottom portion and adapted to bear against the refractory ring 14 and the casing 13.

The outer wall of the refractory support 15 carries suitably arranged electric heating elements 17, which may be of any desired configuration. These heating elements are shown as spiral coils retained in suitable grooves 18 provided in the support 15. Surrounding the refractory support 15 and spaced therefrom is a casing member 19, which is preferably composed of refractory heat-insulating material and is adapted to be retained in position by the metallic casing member 13. In the preferred embodiment, this casing member 19 is shown as having its inner walls substantially parallel to the walls of the orifice ring 14 and of the refractory support 15. By removing the casing 13, any of the several parts are readily accessible for replacement and repair.

In spacing the refractory heating element support 15 from and in substantially parallel relation to the refractory orifice 14, an annular air space 20 is provided between these members. This annular air space effectively provides a means for protecting the heater elements as hereinafter described. The outer wall of the refractory insulating member 19 may be adapted to conform to the general configuration of the metallic casing 13, thereby forming a durable construction. Mounted in the casing 13 are suitable insulator bushings 21 and 22 adapted to accommodate the respective lead-in wires 23 and 24 which connect with the heating coil 17. The casing 13 containing the heater unit is detachably secured to the furnace frame members 12 by any suitable means, as for example, by lag bolts 25.

While I have shown this unit secured by bolts, it is obvious that it may be provided with a hinge and latch mechanism of well-known construction which will also permit quick removal of the ring unit and facilitate replacement and repair of the heater and ring parts. The mold charges are directly affected by the condition of the orifice ring, and in order to maintain the feeding of uniform mold charges, it is necessary to frequently replace the worn ring. A discharge unit constructed in accordance with the present invention may be readily attached to and removed from the container without stopping the flow of glass, thereby facilitating the continued operation of the feeder. Should it be desirable to change orifice rings, this may also be accomplished with like ease and facility, and with minimum interruption in the operation of the feeder.

The air space 20 between the orifice ring 14 and the refractory heater ring 15 is provided to permit the discharge of glass whose temperature is higher than the safe working temperature of the metallic heating element 17. If, for instance, the heating element 17 cannot be worked safely above 2100° F. and molten glass with a temperature of 2300° F. is discharged through the orifice ring, it might be possible under certain conditions of discharge for the orifice ring to acquire a temperature somewhere between 2100° F. and 2300° F. which would be injurious to the heating element 17 were it not protected by the air space 20.

When glass having a higher temperature than that attained by the heating element 17 is discharged through the orifice, the heating element is still of great benefit even though its temperature is lower than that of the glass. This is because the heating element still protects the orifice ring from extraneous chilling influences and minimizes its cooling. It also minimizes the lining of cold glass which tends to form on the walls of the orifice ring. Another advantage which is retained in spite of the temperature limitations of the heating element is that of preventing chilling of glass in the orifice when the feeder is out of operation, thereby facilitating quick and easy starting of the feeder.

Figure 2:
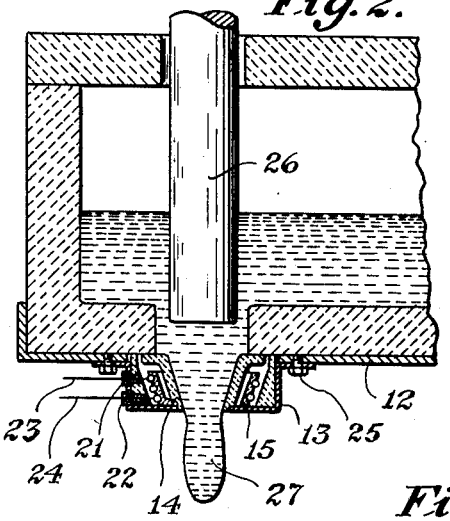
Fig. 2 is a vertical section view through the discharge orifice of a glass feeder equipped with an orifice heater constructed in accordance with my invention.

Fig. 2 shows the forehearth of a glass feeder of the plunger type embodying the improved outlet heater described above. In this type of feeder, the plunger 26 reciprocates periodically to feed mold charges of glass through the discharge orifice, to which the electric heater is attached.

Figure 3:
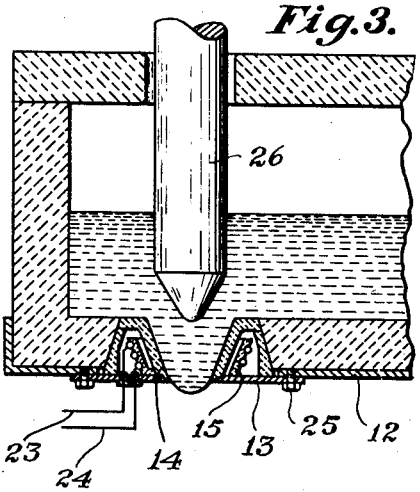
Fig. 3 is a view similar to Fig. 2, showing an orifice heater of modified construction.

In the embodiment shown in Fig. 3, the electric heating unit is mounted in the bottom wall of the forehearth. This construction is particularly desirable in installations where it is necessary to conserve space between the feeder and the glass fabricating appartus.

Various changes and modifications may be made in the constructions shown herein without departing from the scope of the appended claims.

What I claim is:

1. As an element of a glass feeder, an outlet structure comprising a refractory discharge nozzle provided with a spaced surrounding casing, and electrical heating means mounted on a support within the casing and spaced from the nozzle.

2. As an element of a glass feeder, an outlet structure comprising a refractory discharge nozzle provided with a spaced surrounding casing, a support located within the casing and spaced from the nozzle walls, and electrical heating means mounted on the support.

3. As an element of a glass feeder, a nozzle unit for discharging molten glass, comprising a casing, inner and outer annular refractory wall members supported in the casing, a refractory support member located between and spaced from said annular members, and electrical heating means carried by the support.

4. As an element of a glass feeder, a nozzle unit for discharging molten glass, including spaced concentric and refractory orifice ring members, electrical heating elements located in the annular space between said ring members, and a refractory member spaced from the inner refractory orifice member for supporting the heating elements.

5. In an apparatus for separating molten glass into mold charges, a nozzle for discharging molten glass, comprising inner and outer refractory wall members arranged to form an intermediate chamber, a refractory support member located between the refractory members, and electrical heating means carried by the refractory support.

6. The combination with a receptacle for molten glass having a discharge nozzle, of a removable heater unit comprising a refractory support surrounding said nozzle and spaced therefrom, electrical heating means mounted on said support, and a casing surrounding said support, the said casing being detachable to permit removal of said heater unit.

7. In apparatus for feeding molten glass, a refractory discharge nozzle provided with a hollow surrounding casing, a support located within the hollow casing, and electrical heating elements surrounding the nozzle, said heating elements being arranged in a spiral on the support.

8. In combination with the outlet of a container for molten glass, an outlet structure including a refractory discharge nozzle provided with a heat-radiating element surrounding the nozzle and spaced therefrom, and electrical heating elements carried by the heat radiating element and spaced apart thereon.

9. In combination with the outlet of a container for molten glass, an outlet structure including a refractory discharge nozzle, a heat-radiating element surrounding the nozzle and spaced therefrom, and electrical heating means carried by the heat radiating element.

10. In combination with the outlet of a container for molten glass, an outlet structure including a refractory discharge nozzle, a concentric frusto-conical heat-radiating element surrounding the nozzle and spaced therefrom, and electrical heating means carried on the outer surface portion of the heat-radiating element.

11. In combination with the outlet of a container for molten glass, an outlet structure including a frusto-conical refractory discharge nozzle, a heat-radiating element surrounding the nozzle and spaced therefrom, electrical heating means carried by the heat-radiating element, and a refractory casing member spaced from and surrounding the heat-radiating element.

Signed at Hartford, Connecticut, this 28th day of March, 1925.

KARL E. PEILER.